_United States Patent Office_

2,954,274
Patented Sept. 27, 1960

2,954,274

METAL CHLORIDE MANUFACTURE

Robert H. Walsh, Akron, Ohio, assignor to Columbia-Southern Chemical Corporation, Allegheny County, Pa., a corporation of Delaware No Drawing. Filed Mar. 13, 1956, Ser. No. 571,153

9 Claims. (Cl. 23—87)

The present invention deals with novel methods of preparing metal chlorides, and more particularly pertains to the treatment of metal oxides with hydrogen chloride to provide the metal chlorides. Further, it has relation to reaction of hydrogen chloride and naturally occurring metal oxides, notably rutile and ilmenite ores, to produce iron chlorides and titanium tetrachloride while concurrently producing elemental hydrogen.

It now has been discovered according to this invention that efficient and effective preparation of metal chloride from hydrogen chloride and metal oxide involves conducting the reaction under conditions which insure the simultaneous production of elemental hydrogen and a carbon oxide containing only carbon and oxygen atoms, notably carbon monoxide. This, it has now further been found, includes conducting the reaction such that the oxygen values of the converted metal oxide are as a carbon oxide and the hydrogen values of the reacted hydrogen chloride are as elemental hydrogen in the products of reaction. That is, these oxygen values are precluded from appearing in the final products in combination with hydrogen as water, and are instead as a carbon oxide. Thus, the hydrogen values of the consumed hydrogen chloride appear as elemental hydrogen in the products of reaction.

For metal chloride, elemental hydrogen and a carbon oxide to be formed as herein intended, metal oxide and hydrogen chloride are brought into reactive contact with carbon present, usually as elemental carbon. Enough carbon is required to combine chemically with a quantity of oxygen equivalent to that liberated by the conversion of metal oxide to metal chloride. Or, in other words, the quantity of carbon is adjusted and maintained such that essentially all the oxygen originally present in the metal oxide converted to metal chloride is in the reaction products as a carbon oxide. This precludes water as an end product and also insures the production of elemental hydrogen.

According to a further embodiment hereof, the elemental hydrogen is separated and utilized. As herein intended, this separation includes completely isolating the elemental hydrogen, chemically combining the hydrogen by reaction with carbon monoxide such as to form methanol or separating metal chloride from the reaction products. Thus, the separation may be achieved by physical techniques and/or by chemical expedients; the hydrogen may be recovered as elemental hydrogen, as a gas mixture containing elemental hydrogen from which the metal chloride has been removed or in chemically combined form, i.e. as methanol. By cooling, the metal chloride can be selectively condensed, leaving a gas mixture including hydrogen and a carbon oxide, notably carbon monoxide. Unreacted hydrogen chloride may also be included. This gas mixture may be resolved into its individual components or combinations of components by recognized expedients.

The elemental hydrogen and carbon monoxide mixture may be chemically combined as an expedient for separating the elemental hydrogen. For example, hydrogen and carbon monoxide, as provided herein, may be subjected to superatmospheric pressures of some 3000 pounds per square inch and temperatures typically ranging from 325 to 425° C., thereby providing methanol. In turn, methanol may be oxidized to formaldehyde at 250° C. with a silver or copper catalyst. Thus, an advantage of the present invention is the preparation of elemental hydrogen and carbon monoxide, which are of commercial utility.

In the treatment of titanium oxides, particularly titanium dioxide, the present invention involves passing gaseous hydrogen chloride into a mixture of finely divided, porous, titaniferous ore, such as rutile, and carbon usually in the form of coke. The carbon content of the bed is established and maintained such that sufficient carbon is available for chemically uniting with the oxygen values of the titanium oxide which is chlorinated to its titanium tetrachloride. The overall reaction may be represented as follows:

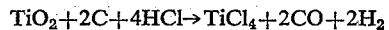

$$TiO_2 + 2C + 4HCl \rightarrow TiCl_4 + 2CO + 2H_2$$

A satisfactory carbon concentration requires the presence of at least two moles of elemental carbon per mole of produced titanium tetrachloride. With high conversions of the titanium dioxide, this necessitates establishing a mixture of titanium dioxide and carbon of at least approximately 24 percent carbon by weight of the mixture. More than this quantity of carbon may be used.

Hydrogen chloride reacts with titaniferous ores, or titanium dioxide, to form titanium tetrachloride in discernible quantities at temperatures above 1250° C. At from 1300° C. to 1600° C., the desired reaction and formation of titanium tetrachloride proceed at a satisfactory rate. Even higher temperatures admit of the reaction, but because of equipment limitations, the process is preferably operated at 1300° C. to 1450° C.

In practice, the process is expeditiously conducted by passing hydrogen chloride gas at varying velocities upwardly through a bed of finely divided, solid titaniferous ore and carbon. When a gas is passed through a bed of solid material, several different conditions may be established depending upon the gas velocity, size of the particles, etc. Thus, if the gas velocity is low, the bed of solids remains static; the gas simply passes through the bed pores. On the other hand, as the gas velocity is increased, at least some of the particles become dynamically suspended in the upwardly moving gas stream. As a result the bed height expands. Such beds are termed "dynamic beds." If the gas velocity is still further increased, the particles all become suspended and the bed expands further. Ultimately, the bed may assume a highly turbulent condition which in many ways resembles a boiling liquid.

The present process may be conducted with gas velocities that provide for dynamic and fluidized beds. The exact conditions requisite to establishing such bed conditions depend upon such factors as the particle size of the bed components, the gas density, the density of the particles, etc. Wilhelm and Kwauk, Chemical Engineering Progress, volume 44, page 201 (1948), equate the various factors necessary for fluidizing the bed, and by following the principles therein discussed, the desired bed condition may be provided.

If necessary, the hydrogen chloride gas may be diluted with an inert gas, i.e. nitrogen, or with a reducing gas such as hydrogen or carbon monoxide, to achieve adequate gas velocities.

The following examples illustrate the manner in which a titaniferous ore comprised almost exclusively of titanium dioxide, e.g. rutile, may be treated in accordance with the present invention:

EXAMPLE I

A vertically disposed sillimanite tube 26 inches high and one of inch internal diameter surrounded by a furnace comprised the reactor. At its lower end, the tube was tapered. A Coors No. 2 porcelain disc was cemented inside the tube at the shoulder provided by the taper. A Pyrex head having a take off arm and a nickel screw feeder equipped with a hopper was clamped to the top of the tube by a ball and socket fitting. Strip heaters were used to prevent any plugging in the head due to ferrous chloride. The tube was initially charged with 72 grams of rutile and 72 grams of petroleum coke in finely divided state. The rutile contained 94.9 percent titanium dioxide and 1.4 percent $Fe_2O_3$. Then with the furnace in operation and the temperature of 1350° C., hydrogen chloride gas was passed at the rates hereinafter indicated upwardly through the tapered end of the tube and porcelain disc into the bed of rutile and coke. Product was recovered in a collection flask and samples of the vent gases leaving the flask were analyzed.

The following table lists the conditions of several runs performed according to the above procedure:

*Table I*

| Rate of HCl feed, liters/minute | Length of Run, Minutes | Grams of $TiCl_4$ | Vent Gas Sample Analysis (by Volume) | | |
|---|---|---|---|---|---|
| | | | HCl | $H_2$ | CO |
| 0.2 | 246 | 48.7 | 32.1 | 33.1 | 33.4 |
| 0.4 | 207 | 73.5 | 23.7 | 33.8 | 42.4 |
| 0.55 | 245 | 83.6 | 35.0 | 31.8 | 29.7 |

EXAMPLE II

Using the apparatus and procedure of Example I, a 144 gram rutile and petroleum coke mixture containing 76 percent rutile by weight of the two was initially charged to the reactor tube, and in the same proportions a rutile and coke mixture was fed continuously at the rate of 0.152 gram per minute to the reactor during a four-hour run. The reactor was at 1350° C., and hydrogen chloride was fed at a rate of 0.4 liter per minute. Gas samples were taken every 15 minutes and analyzed by mass spectrometry.

The composite gas analysis was:

| Material: | Percent by weight |
|---|---|
| $COCl_2$ | 0.1 |
| $CO_2$ | 0.3 |
| $O_2$ | 0.1 |
| $N_2$ | 2.3 |
| CO | 22.7 |
| $H_2$ | 21.2 |
| HCl | 53.1 |

A total of 75.1 grams of titanium tetrachloride was produced. Analysis of the titanium tetrachloride showed the following minor impurities:

| | | |
|---|---|---|
| Chloroacetyl chlorides | parts per million | 4 |
| Sulfur | do | 3 |
| Iron | do | 2 |
| Vanadium | percent by weight | 0.001 |

It should be noted that the vanadium content of the product is extremely low. Since the presence of vanadium is often encountered in other titanium tetrachloride preparations, the present invention provides the added advantage of preparing directly an especially low vanadium content titanium tetrachloride.

EXAMPLE III

A charge consisting of 25 grams of rutile ore (94.9 percent $TiO_2$, 1.4 percent $Fe_2O_3$) and 25 grams of petroleum coke (essentially pure carbon) was placed in a one inch sillimanite tube and heated to 1400° C. Nitrogen gas was first passed upwardly through the bed and charge to establish a fluidized bed. Thereafter, hydrogen chloride gas was passed upwardly through the bed at the rate of 600 cubic centimeters per minute until 0.72 mole had been fed. A total of 20.2 grams of titanium tetrachloride was obtained, representing a 59 percent yield basis hydrogen chloride fed, while the gases other than titanium tetrachloride leaving the reaction contained, for practical purposes only carbon monoxide, hydrogen and unreacted hydrogen chloride in substantial amounts.

EXAMPLE IV

Following the procedure of Example III, but operating at 1500° C., a total of 0.21 mole of hydrogen chloride was fed at the rate of 245 cubic centimeters per minute. A total of about 4 grams of titanium tetrachloride was obtained, representing a 40 percent yield based on the fed hydrogen chloride. After removal of the titanium tetrachloride, effluent gases consisted essentially of carbon monoxide, elemental hydrogen and unreacted hydrogen chloride.

According to a further embodiment, titaniferous ores of other than rutile quality are treated with hydrogen chloride in the presence of an adequate amount of carbon. Thus, ilmenite ores which contain substantial iron oxide concentrations along with titanium dioxide may be converted to iron chlorides and titanium chloride. Ilmenite ores contain from 50 to 70 percent titanium dioxide with the balance primarily iron oxides, usually from 3 to 10 percent as ferrous oxide and 25 to 30 percent of the iron as ferric oxide. Minor quantities of oxides of vanadium, niobium, chromium and silicon, etc. may be present.

Iron oxides are converted to iron chlorides with hydrogen chloride at temperatures which differ substantially from those required for titanium tetrachloride preparations with hydrogen chloride. This conversion occurs at 650° C. to 1000° C. or 1100° C., whereas titanium dioxide conversion requires at least 1250° C. Thus, by judiciously controlling temperatures it is possible to prepare directly titanium tetrachloride from titaniferous ores of sizeable iron oxide, e.g. ilmenite, or other titaniferous materials high in iron oxides such as certain slags, e.g. Sorel slag.

In one embodiment hereof, a titaniferous ore typified by ilmenite is treated with hydrogen chloride at 650° C. to 1100° C. At such temperatures, the metal oxide conversion is restricted to iron oxides. As a consequence, the iron oxide contents of the ore are transformed into iron chlorides while the titanium components remain unconverted. These iron chlorides are then removed as gases by vaporization or by liquid separation, leaving behind an ore residue substantially free of iron oxides and considerably enriched in titanium content. Ilmenite ores, for example, are upgraded to rutile quality, e.g. 95 to 98 percent titanium dioxide contents.

The following example illustrates the removal of iron oxides from ilmenite ores thereby leaving an ore residue of enriched titanium content:

EXAMPLE V

The reactor consisted of a vertically positioned, 24-inch high tube one inch in diameter, tapered, beginning 10 inches from its lower end down to 0.25 inch diameter. A perforated, 0.75 inch porcelain disc was supported on a shoulder in the tapered end of the reactor tube. A one-half inch bed of porcelain chips was supported on the disc, and the charge disposed on this bed of chips.

In operation the charge was fluidized with the gas stream delivered upwardly through the reactor. The effluent gases were passed into a cyclone dust separator, and thereafter into the bottom of a scrubbing column filled with one quarter inch Berl saddles. A stream of 4 normal aqueous potassium hydroxide was passed downwardly through the scrubber and the unreacted hydrogen chloride absorbed.

Nitrogen gas was initially fed while heating the bed to 1000° C., whereafter hydrogen chloride feed was commenced at fluidizing velocities, approximately 15 millimoles per minute. The charge consisted of 20 grams ilmenite, analyzing 60.2 percent $TiO_2$, 27.6 percent $Fe_2O_3$ and 5.5 FeO, and 25 grams of petroleum coke (97–98 percent elemental carbon). The residue ore in the tube was analyzed for its iron, coke and titanium content. The evolution of elemental hydrogen and carbon monoxide accompanied the iron chloride product.

A series of runs made according to the above procedure were conducted with these results:

*Table II*

| Period of HCl feed-minutes | Analysis of Residue (Percent by Weight) | | | Percent Fe Removed |
|---|---|---|---|---|
| | Fe | Ti | Coke | |
| 30 | 5.50 | 52.8 | 4.14 | 84 |
| 40 | 2.25 | 55.5 | 4.28 | 93 |
| 50 | 0.99 | 55.7 | 5.68 | 97 |
| 60 | 0.22 | 58.1 | 2.79 | 99 |
| 120 | 0.009 | 57.6 | 3.99 | 99+ |

The iron removed was as ferrous chloride. No conversion of titanium to titanium tetrachloride was observed. Thus, the conversion of the iron in the ilmenite was selective such that essentially all iron was removed from the ilmenite, leaving a residue almost entirely of titanium oxide, on a metal oxide basis.

In conjunction with titanium tetrachloride manufacture, the concepts of the present invention may be utilized to initially remove iron oxides from titaniferous ores and thereafter subject the remaining highly concentrated titanium dioxide ore residue to a further chlorination, whether by the use of elemental chlorine, or in accordance with the hydrogen chloride process of the present invention.

Thus, the residues obtained by removing iron as in Example V may be treated with hydrogen chloride in the presence of carbon to obtain titanium tetrachloride, as illustrated by the following:

EXAMPLE VI

A mixture of 20 grams of material consisting of the residues from Example V and 10 grams of petroleum coke was treated with hydrogen chloride fed at the rate of 300 cubic centimeters per minute for one hour under fluidizing conditions at 1400° C. The residues used analyzed 55 percent titanium and less than 0.06 percent iron, by weights. Some 13 grams of titanium tetrachloride was obtained.

With the low grade titaniferous ores such as ilmenite, an appreciable consumption of hydrogen chloride is encountered in the removal of the iron oxides as iron chlorides. Since the iron chlorides are presently of but limited commercial value, this represents a serious economic problem.

The present invention may be practiced in conjunction with a cyclic process for treating ilmenite or comparable low grade titaniferous ores. In such a process, ilmenite ore is first treated with gaseous hydrogen chloride in the presence of carbon at temperatures above 650° C. but below 1250° C. Under such conditions, the iron contents of the ilmenite are selectively converted to iron chlorides, notably ferrous chloride, leaving an ore residue free from iron oxides.

Iron chlorides produced in this first phase may be reconverted to iron oxides and elemental chlorine by oxidation. This elemental chlorine is then available for chlorination of the titaniferous residue to titanium tetrachloride. Thus, the overall effect is the use of hydrogen chloride to provide at least a goodly portion of the necessary chlorine.

When heated to between 400° C. and 1000° C. in an oxidizing atmosphere, i.e. in an air atmosphere or in oxygen, iron chlorides are transformed into iron oxides and elemental chlorine. By fluidizing a bed of finely divided iron chloride with oxygen at such temperatures, the oxidation proceeds with relative ease. Sometimes, the bed advantageously may have iron oxide admixed with the iron chloride.

If, instead of elemental chlorine, hydrogen chloride is desired from the iron chloride, the oxidation is conducted in the presence of water. In one technique, superheated steam is admixed with vaporized iron chloride in an oxidizing atmosphere. By adjusting the quantity of water, anhydrous hydrogen chloride is obtained. Iron oxides, in their solid state, are separated from the hydrogen chloride gas by mechanical expedients, i.e. a cyclone separator.

In another embodiment, the hydrogen evolved by the reaction may be utilized to reduce the metal oxide to metal. This is especially true with iron oxides which are reduced by hydrogen to finely divided metallic iron, a valuable product.

In these processes, optimum utilization of the hydrogen chloride depends upon various factors including bed depth, gas velocity, temperature and particle size of the metal oxide and carbon. Bed depths of from 2 feet to 10 feet are generally found most suitable for efficiently utilizing the hydrogen chloride. The metal oxide and carbon preferably range in size from 50 to 250 microns. Even these conditions are correlated with those suitable for fluidization of the bed.

Although fluidized beds are ideal for conducting this process, the invention may be conducted using static beds. One type of static bed may be comprised of briquettes formed from the metal oxide and coke. Finely divided metal oxide and coke may be compressed or otherwise shaped into spheres or other rounded solids of substantial size. Briquettes, for example, may be prepared by tumbling a bituminous coal with the metal oxide at a temperature at which the coal is plastic.

As indicated, the present invention is applicable to the conversion of various metal oxides to their corresponding chlorides. Materials suitable for treatment include ferric oxide, ferrous oxide and titanium oxides, notably titanium dioxide. As found in their natural form as ores, such oxides are specifically intended herein. Rutile ores which are predominantly titanium dioxide, e.g. contain between 90 and 99 percent titanium dioxide by weight, are used with efficiency. Also, lower grade titaniferous ores such as ilmenite which usually contain from 45 to 60 or 70 percent titanium dioxide by weight, are treated. The other major constituent of ilmenite is comprised of ferrous and ferric oxide. Other metal oxide materials such as slag from various refining operations in which a goodly portion of the iron oxide has been removed are useful. Typical slags often contain up to 70 percent by weight of titanium dioxide with the balance again being mainly iron oxides. Still other titaniferous materials and ferric oxides are aptly employed. Many of these ores contain minor concentrations of various other metallic impurities including vanadium, molybdenum, etc. as well as silicious components.

A further advantage realized herein is the high purity of the titanium tetrachloride. Most notable in this regard is the extremely low vanadium content of the titanium chloride. When titaniferous ores are chlorinated, almost invariably the titanium tetrachloride contains vanadium. When the titanium tetrachloride is destined for particular uses, such as in the preparation of sponge titanium metal, the vanadium is undesirable. Various purification processes have been suggested and employed to reduce the vanadium content of the titanium tetrachloride. However, in conjunction with the present invention, it has been observed that the vanadium content of the produced titanium tetrachloride is substantially lower than the concentrations encountered when a comparable ore is treated with elemental chlorine, often to the extent that a vanadium purification treatment may be avoided.

Although the present invention has been described with respect to specific details of certain embodiments, it is not intended that the invention be construed as being limited thereto except insofar as they are included in the appended claims.

I claim:

1. A method of producing metal chloride which comprises contacting a mixture containing carbon and having as its principal metal oxide component metal oxide selected from the group consisting of iron oxides, titanium oxides and mixtures thereof with hydrogen chloride, converting such metal oxide to metal chloride by reaction of hydrogen chloride and metal oxide in the presence of carbon, maintaining sufficient carbon in the mixture during said conversion to combine chemically with a quantity of oxygen equivalent to that liberated by the conversion of metal oxide to metal chloride and to insure that the hydrogen values of the reacted hydrogen chloride appear in the products of reaction as elemental hydrogen, obtaining concurrently with the formation of metal chloride the oxygen values of such converted metal oxide as carbon oxide and the hydrogen values of the reacted hydrogen chloride as elemental hydrogen in the products of reaction whereby the production of water from said hydrogen and oxygen values is precluded.

2. A method of producing metal chloride which comprises contacting a mixture containing carbon and having as its principal metal oxide component metal oxide selected from the group consisting of iron oxides, titanium oxides and mixtures thereof with hydrogen chloride, converting such metal oxide to metal chloride by reaction of hydrogen chloride and metal oxide in the presence of carbon, maintaining sufficient carbon in the mixture during said conversion to combine chemically with a quantity of oxygen equivalent to that liberated by the conversion of metal oxide to metal chloride and to insure that the hydrogen values of the reacted hydrogen chloride appear in the products of reaction as elemental hydrogen, obtaining concurrently with the formation of metal chloride the oxygen values of such converted metal oxide as carbon oxide and the hydrogen values of the reacted hydrogen chloride as elemental hydrogen in the products of reaction whereby the production of water from said hydrogen and oxygen values is precluded and separating the hydrogen.

3. A method of producing a metal chloride which comprises passing gaseous hydrogen chloride upwardly into a porous bed containing finely divided carbon and having as its principal metal oxide component metal oxide selected from the group consisting of iron oxides, titanium oxides and mixtures thereof, converting metal oxide content of the bed to metal chloride by reaction with hydrogen chloride in the presence of carbon, maintaining throughout the conversion sufficient content of carbon in said bed to combine chemically with a quantity of oxygen equivalent to that liberated by the conversion of metal oxide to metal chloride and to insure that the hydrogen values of the reacted hydrogen chloride appear in the products of reaction as elemental hydrogen, obtaining concurrently with the formation of metal chloride the oxygen values of the converted metal oxide as carbon oxide and the hydrogen values of the reacted hydrogen chloride as elemental hydrogen in the gas stream rising out of the bed whereby the appearance of water from the hydrogen values of the reacted hydrogen chloride and oxygen values of converted metal oxide in said moving stream is precluded and cooling selectively the gas mixture of metal chloride hydrogen and carbon oxide to condense metal chloride and separate elemental gaseous hydrogen.

4. A method of producing titanium tetrachloride which comprises contacting a mixture having as its principal metal oxide component rutile and carbon with hydrogen chloride at from 1300° C. to 1600° C., converting rutile to titanium tetrachloride by reaction of hydrogen and rutile in the presence of carbon, maintaining sufficient carbon in said mixture during such conversion to combine chemically with a quantity of oxygen equivalent to that liberated by the conversion of rutile to titanium tetrachloride and to insure that the hydrogen values of the reacted hydrogen chloride appear in the products of reaction as elemental hydrogen, obtaining concurrently with metal chloride the oxygen values of the converted rutile as carbon oxide and the hydrogen values of the reacted hydrogen chloride as elemental hydrogen in the products of reaction whereby the production of water from said hydrogen and oxygen values is precluded.

5. A method of producing iron chloride which comprises contacting a mixture containing carbon and as its principal metal oxide component iron oxide with hydrogen chloride at from 650° C. to 1100° C., converting iron oxide to ferrous chloride by reaction of hydrogen chloride and iron oxide in the presence of carbon, maintaining sufficient carbon in said mixture during the conversion to combine chemically with a quantity of oxygen equivalent to that liberated by the conversion of iron oxide to ferrous chloride and to insure that the hydrogen values of the reacted hydrogen chloride appear in the products of reaction as elemental hydrogen, obtaining concurrently with the ferrous chloride the oxygen values of the converted iron oxide as carbon oxide and the hydrogen values of the reacted hydrogen chloride as elemental hydrogen in the products of reaction whereby the production of water from said hydrogen and oxygen values is precluded.

6. A method of preparing titanium tetrachloride and iron chloride which comprises contacting a mixture containing carbon, and having iron oxide and titanium oxide as its principal metal oxide component with hydrogen chloride at from 650° C. to 1100° C., selectively converting substantially all of the iron oxide in the mixture to iron chloride by reaction of hydrogen chloride with iron oxide in the presence of carbon, thereafter contacting the resulting substantially iron oxide free mixture with hydrogen chloride at from 1300° C. to 1600° C., converting the titanium oxide to titanium tetrachloride by reaction of hydrogen chloride and titanium oxide in the presence of carbon, during both conversions maintaining sufficient carbon in the respective mixtures to combine chemically with a quantity of oxygen equivalent to that liberated by the conversion of the metal oxide to its respective metal chloride and to insure that the hydrogen values of the reacted hydrogen chloride appear in the reaction products as elemental hydrogen, obtaining concurrently with the respective metal chloride the oxygen values of the converted iron and titanium oxides as carbon oxide and the hydrogen values of the reacted hydrogen chloride as elemental hydrogen in the products of reaction whereby the production of water from said oxygen and hydrogen values is precluded.

7. A method of preparing titanium tetrachloride and iron chloride which comprises contacting a mixture containing carbon and having as its principal metal oxide component iron oxide and titanium oxide with gaseous hydrogen chloride at from 650° C. to 1100° C., selectively converting iron oxide to iron chloride by reaction of hydrogen chloride and iron oxide in the presence of carbon, thereby providing a titanium oxide rich residue, maintaining sufficient carbon in the mixture during said conversion to combine chemically with a quantity of oxygen equivalent to that liberated by the conversion of iron oxide to iron chloride and to insure that the hydrogen values of the reacted hydrogen chloride appear in the reaction products as elemental hydrogen, obtaining concurrently with iron chloride the oxygen values of the converted iron oxide as carbon oxide and the hydrogen values of the reacted hydrogen chloride as elemental hydrogen in the products of reaction whereby the production of water from such oxygen and hydrogen values is precluded, oxidizing the thusly prepared iron chloride to iron oxide and chlorine, and thereafter chlorinating the titanium oxide residue with said chlorine to form titanium tetrachloride.

8. A method of preparing titanium tetrachloride which comprises contacting a mixture containing carbon and having as its principal metal oxide component titanium oxide with hydrogen chloride, converting titanium oxide to titanium tetrachloride by reaction of hydrogen chloride and titanium oxide in the presence of carbon at from 1300° C. to 1600° C., maintaining in said mixture during the conversion at least two moles of carbon per mole of titanium tetrachloride formed by said conversion, obtaining concurrently in the products of reaction the hydrogen values of the reacted hydrogen chloride as elemental hydrogen and the oxygen values of the converted titanium oxide as carbon oxide whereby the production of water from said oxygen and hydrogen values is precluded.

9. A method of preparing titanium tetrachloride and iron chloride which comprises contacting a mixture containing carbon and having as its principal metal oxide component iron oxide and titanium oxide with gaseous hydrogen chloride, selectively converting iron oxide to iron chloride by reaction with hydrogen chloride at 650° C. to 1100° C. in the presence of carbon thereby providing a titanium oxide rich residue, maintaining sufficient carbon in said mixture during the conversion to combine chemically with a quantity of oxygen equivalent to that liberated by the conversion of iron oxide to iron chloride and to insure that the hydrogen values of the reacted hydrogen chloride appear in the reaction products as elemental hydrogen, obtaining concurrently with the iron chloride in the reaction products the oxygen values of the converted iron oxide as carbon oxide and the hydrogen values of the reacted hydrogen chloride as elemental hydrogen whereby the production of water from said oxygen and hydrogen values is precluded, separating the iron chloride from elemental hydrogen and the carbon oxide in the reaction products, oxidizing the iron chloride to iron oxide and chlorine and thereafter chlorinating the titanium oxide residue with said chlorine to obtain titanium tetrachloride.

References Cited in the file of this patent

UNITED STATES PATENTS

| | | |
|---|---|---|
| 1,707,257 | Rohden | Apr. 2, 1929 |
| 1,845,342 | Saklatwalla | Feb. 16, 1932 |
| 2,184,884 | Muskat et al. | Dec. 26, 1939 |
| 2,184,885 | Muskat et al. | Dec. 26, 1939 |
| 2,589,466 | Wilcox | Mar. 18, 1952 |
| 2,723,903 | Cyr et al. | Nov. 15, 1955 |
| 2,752,300 | Cooper | June 26, 1956 |
| 2,752,301 | Cooper | June 26, 1956 |

OTHER REFERENCES

Barksdale: "Titanium," The Ronald Press Co., New York, 1949, pages 310–312.